(12) United States Patent
Kim et al.

(10) Patent No.: US 11,545,685 B2
(45) Date of Patent: Jan. 3, 2023

(54) OPERATION CONTROL SYSTEM AND METHOD OF FUEL CELL VEHICLE

(71) Applicants: Hyundai Motor Company, Seoul (KR); Kia Motors Corporation, Seoul (KR)

(72) Inventors: Sung Do Kim, Seoul (KR); Chang Seok You, Gyeonggi-do (KR); Min Su Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 343 days.

(21) Appl. No.: 16/743,684

(22) Filed: Jan. 15, 2020

(65) Prior Publication Data
US 2021/0083306 A1 Mar. 18, 2021

(30) Foreign Application Priority Data
Sep. 16, 2019 (KR) .................. 10-2019-0113592

(51) Int. Cl.
*H01M 8/04664* (2016.01)
*H01M 8/04858* (2016.01)
*B60L 58/30* (2019.01)

(52) U.S. Cl.
CPC ......... *H01M 8/04686* (2013.01); *B60L 58/30* (2019.02); *H01M 8/04873* (2013.01); *H01M 8/04902* (2013.01); *H01M 8/04932* (2013.01); *H01M 2250/20* (2013.01)

(58) Field of Classification Search
CPC ......... H01M 8/04686; H01M 8/04873; H01M 8/04888; H01M 8/04567; B60L 58/30; B60L 3/0053
See application file for complete search history.

(56) References Cited

U.S. PATENT DOCUMENTS

| | | |
|---|---|---|
| 2002/0157881 A1 | 10/2002 | Bakholdin et al. |
| 2002/0175010 A1 | 11/2002 | Kobayashi et al. |
| 2007/0036664 A1 | 2/2007 | Shibui et al. |
| 2019/0055890 A1 | 2/2019 | Ethier et al. |
| 2019/0181467 A1 | 6/2019 | Farnsworth |

(Continued)

FOREIGN PATENT DOCUMENTS

| | | | |
|---|---|---|---|
| JP | 2018-160430 | * | 10/2018 |
| KR | 10-2006-0070092 A | | 6/2006 |

(Continued)

OTHER PUBLICATIONS

Notice of Allowance dated Oct. 28, 2022 in U.S. Appl. No. 16/385,927.

*Primary Examiner* — Brittany L Raymond
(74) *Attorney, Agent, or Firm* — Fox Rothschild LLP

(57) ABSTRACT

An operation control system and method of a fuel cell vehicle are provided. The system includes a fuel cell, an air supply device operated by a motor, to supply air to the fuel cell and a sensing unit that senses an abnormal operation of the air supply device. A calculation unit calculates a lower-limit voltage of the air supply device required for normal operation of the air supply device when the sensing unit senses abnormal operation of the air supply device. A controller then adjusts a voltage supplied to the air supply device based on the calculated lower-limit voltage.

14 Claims, 4 Drawing Sheets

(56) References Cited

U.S. PATENT DOCUMENTS

| | | |
|---|---|---|
| 2019/0229357 A1 | 7/2019 | Ojima et al. |
| 2019/0267646 A1* | 8/2019 | Yamanaka ........ H01M 8/04753 |
| 2019/0288585 A1 | 9/2019 | Lee et al. |
| 2019/0291590 A1 | 9/2019 | Yeung et al. |
| 2020/0185736 A1 | 6/2020 | Ito et al. |

FOREIGN PATENT DOCUMENTS

| | | |
|---|---|---|
| KR | 10-2017-0122366 A | 11/2017 |
| KR | 2017-0122366 * | 11/2017 |
| KR | 20180126126 A | 11/2018 |

* cited by examiner

OPERATION CONTROL SYSTEM AND METHOD OF FUEL CELL VEHICLE

CROSS-REFERENCE TO RELATED APPLICATION

This application claims priority to Korean Patent Application No. 10-2019-0113592, filed on Sep. 16, 2019, the disclosure of which is incorporated herein by reference.

BACKGROUND

1. Field of the Disclosure

The present disclosure relates to technology for sensing abnormal operation of an air supply device of a fuel cell vehicle, and controlling operation of the fuel cell vehicle.

2. Description of the Related Art

A fuel cell converts chemical energy into electrical energy through oxidation and reduction reaction of hydrogen and oxygen respectively supplied from a hydrogen supply device and an air supply device. Such a fuel cell, which produces electrical energy, includes a cooling system for cooling the fuel cell. In other words, hydrogen is supplied to the anode side of the fuel cell. As oxidation reaction of hydrogen is performed at the anode, protons and electrons are generated. Protons and electrons produced as mentioned above migrate to a cathode through an electrolyte membrane and a separation plate. The protons and electrons that have migrated from the anode produce water through electrochemical reaction thereof performed together with oxygen present in air. Through flow of the electrons, electrical energy is also generated.

An air supply device is provided at the fuel cell to supply air to the cathode. The air supply device is driven by a motor provided therein. The maximum driving speed of the motor may be reduced when irreversible demagnetization of permanent magnets, which are main constituent elements of the motor, occurs. When high power of the fuel cell is required in a state in which performance of the air supply device is degraded as mentioned above, supply of air to a stack may be insufficient and, as such, a stack cell voltage may be momentarily dropped. In this case, a desired output is unable to be maintained.

The above matters disclosed in this section are merely for enhancement of understanding of the general background and should not be taken as an acknowledgement or any form of suggestion that the matters form the related art already known to a person skilled in the art.

SUMMARY

Therefore, the present disclosure provides an operation control system and method of a fuel cell vehicle capable of sensing abnormal operation of an air supply device of a fuel cell, and calculating a voltage required for normal operation of the air supply device, thereby maintaining an output of the fuel cell vehicle during abnormal operation of the air supply device.

In accordance with an aspect of the present disclosure, an operation control system of a fuel cell vehicle may include a fuel cell, an air supply device operated by a motor, to supply air to the fuel cell, a sensing unit configured to sense abnormal operation of the air supply device, a calculation unit configured to calculate a lower-limit voltage of the air supply device required for normal operation of the air supply device when the sensing unit senses abnormal operation of the air supply device, and a controller configured to adjust a voltage supplied to the air supply device based on the lower-limit voltage calculated in the calculation unit.

The sensing unit may be configured to sense operation of the air supply device as abnormal operation when demagnetization occurs in a motor of the air supply device. In particular, the sensing unit may be configured to measure a motor speed, a 3-phase output voltage and 3-phase current in a duration, in which a motor speed of the air supply device is stable, calculate a counter electromotive force constant based on the measured values, a phase resistance, and a designed inductance value, and compare the calculated counter electromotive force constant with a predetermined counter electromotive force constant value, thereby sensing whether demagnetization of the motor of the air supply device has occurred.

The operation control system may further include an air supply device position sensor configured to sense a position of the air supply device. In particular, incorrect determination may occur when an offset angle of the air supply device position sensor is varied. Accordingly, the sensing unit may be configured to sense an operation state after identification as to whether correction of the offset angle is necessary. The calculation unit may be configured to calculate a lower limit of a supply voltage capable of maintaining a maximum speed of the motor of the air supply device when demagnetization of the motor of the air supply device has occurred, based on a counter electromotive force constant calculated from the sensed results of the sensing unit.

The operation control system may further include an auxiliary power supply device for auxiliary supply of electric power in addition to the fuel cell, a charged amount measurement unit connected to the controller and configured to measure a charged amount of the auxiliary power supply device, and a converter connected to the auxiliary power supply device, to adjust a voltage of the auxiliary power supply device. In particular, the controller may be configured to adjust a voltage supplied to the air supply device to be a lower-limit voltage by operating the converter connected to the auxiliary power supply device when the charged amount of the auxiliary power supply device measured in the charged amount measurement unit is equal to or greater than a predetermined value. The controller may be configured to limit a lower-limit voltage range.

The operation control system may further include an auxiliary power supply device for auxiliary supply of electric power in addition to the fuel cell, and a charged amount measurement unit connected to the controller and configured to measure a charged amount of the auxiliary power supply device. The controller may be configured to set a lower voltage limit of the fuel cell, which supplies a lower-limit voltage to the air supply device, when the charged amount of the auxiliary power supply device measured in the charged amount measurement unit is less than a predetermined value.

Thus, it may be possible to control current of the fuel cell based on the set lower voltage limit of the fuel cell. The operation control system may further include a vehicle motor driven by the fuel cell, and a vehicle motor inverter configured to adjust rotation of the vehicle motor. In particular, output current of the vehicle motor inverter may be limited through adjustment of the current of the fuel cell.

In accordance with another aspect of the present invention, an operation control method of a fuel cell vehicle may include sensing abnormal operation of an air supply device, calculating a lower-limit voltage of the air supply device required for normal operation when abnormal operation of the air supply device is sensed, and adjusting a voltage supplied to the air supply device based on the calculated lower-limit voltage.

The sensing may include sensing abnormal operation of the air supply device when demagnetization occurs in a motor of the air supply device. In particular, the sensing may include measuring a motor speed, a 3-phase output voltage and 3-phase current in a duration, in which a speed of the motor of the air supply device is stable, calculating a counter electromotive force constant based on the measured values, a phase resistance, and a designed inductance value, and comparing the calculated counter electromotive force constant with a predetermined counter electromotive force constant value, thereby sensing whether demagnetization of the motor of the air supply device has occurred.

The operation control method may further include measuring a charged amount of an auxiliary power supply device prior to adjusting the voltage. The voltage supplied to the air supply device may be adjusted to be a lower-limit voltage by operating a converter connected to the auxiliary power supply device when the charged amount of the auxiliary power supply device measured in the charged amount measurement step is equal to or greater than a predetermined value.

The operation control method may further include measuring a charged amount of an auxiliary power supply device prior to adjusting the voltage. In particular, the adjusting of the voltage may include setting a lower voltage limit of a fuel cell, which supplies a lower-limit voltage to the air supply device, when the charged amount of the auxiliary power supply device measured in the charged amount measurement step is equal to or less than a predetermined value. Thus, it may be possible to control current of the fuel cell based on the set lower voltage limit of the fuel cell.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
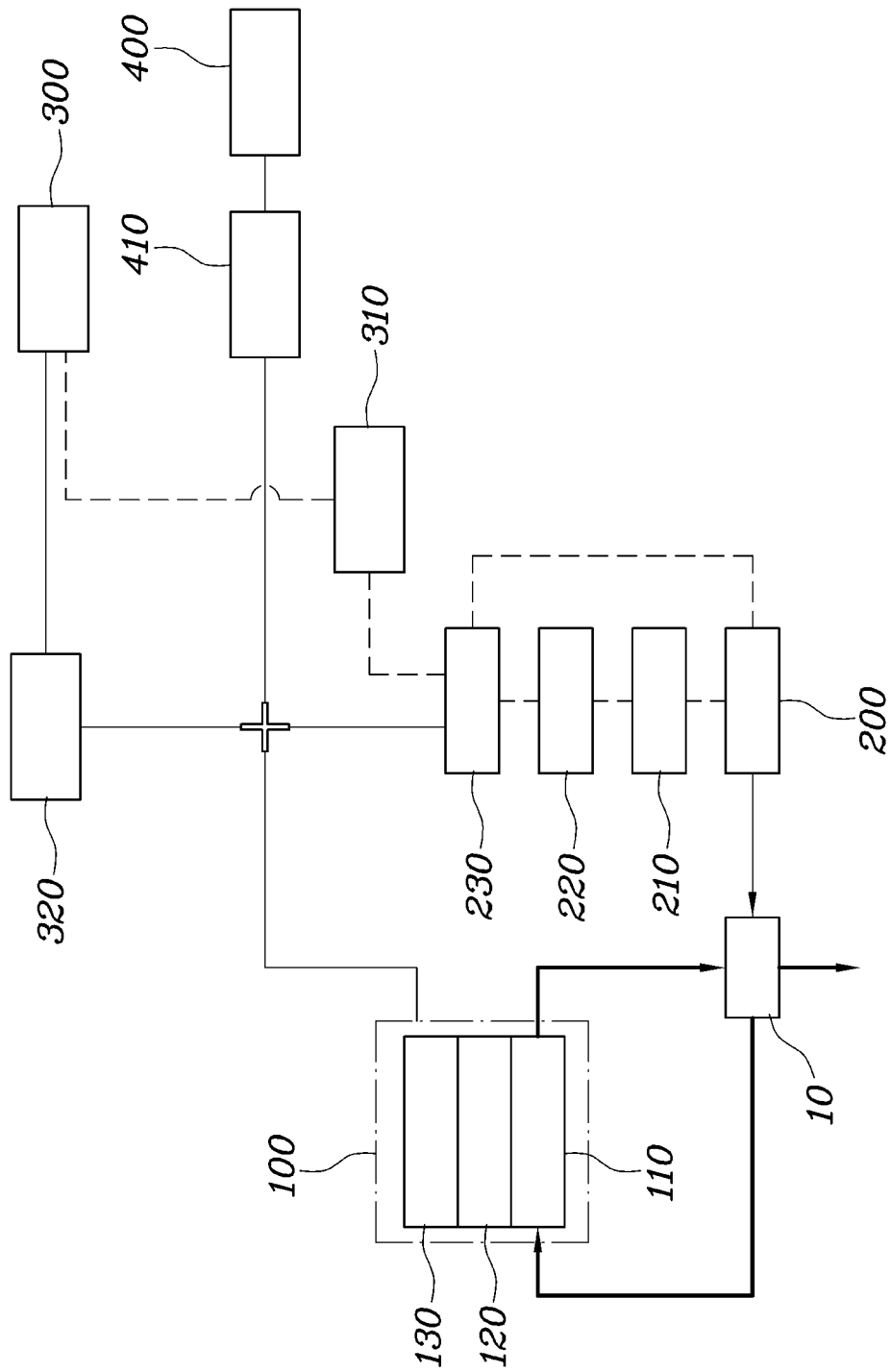
FIG. 1 is a block diagram of an operation control system of a fuel cell vehicle according to an exemplary embodiment of the present disclosure.
Figure 2:
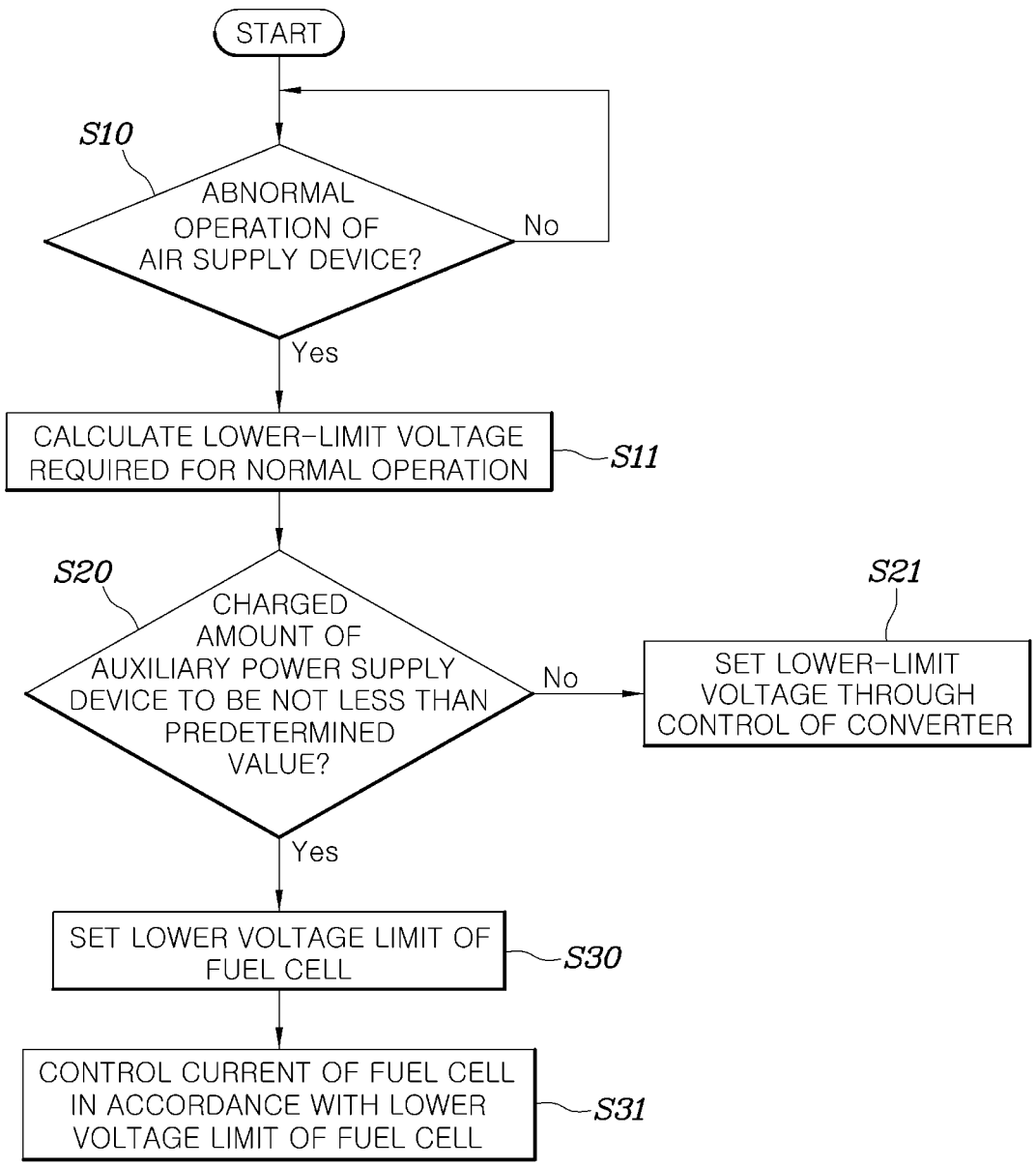
FIG. 2 is a flowchart of an operation control method of a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

For exemplary embodiments of the present disclosure disclosed herein, specific structural or functional descriptions are exemplary to merely describe the exemplary embodiments of the present disclosure, and the exemplary embodiments of the present invention can be implemented in various forms and should not be interpreted as being limited to the embodiments described in the present specification.

As various modifications can be made and diverse exemplary embodiments are applicable to the exemplary embodiments according to the concept of the present invention, specific embodiments will be illustrated with reference to the accompanying drawings and described in detail herein. However, these specific exemplary embodiments should not be construed as limiting the embodiments according to the concept of the present disclosure, but should be construed as extending to all modifications, equivalents, and substitutes included in the concept and technological scope of the invention.

Terms including ordinal numbers such as first and/or second, etc. can be used to describe various elements, but the elements should not be limited by these terms. The terms are used merely for the purpose of distinguishing one element from another element. For example, a first element may be renamed second element and, similarly, a second element may be renamed first element without departing from the scope of right of the invention.

In the case where an element is "connected" or "linked" to the other element, it should be understood that the element may be directly connected or linked to the other element, or another element may be present therebetween. On the contrary, in the case where an element is "directly connected" or "directly linked" to another element, it should be understood that no other element is present therebetween. Other expressions describing a relation between constituent elements, such as "between ~" and "immediately between ~", or "adjacent to ~" and "directly adjacent to ~", and the like, should be construed in a similar manner.

It should be noted that the terms used herein are merely used to describe a specific embodiment, not to limit the present disclosure. Incidentally, unless clearly used otherwise, singular expressions include a plural meaning. In this application, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Unless defined otherwise, the terms used herein including technological or scientific terms have the same meaning that is generally understood by those of ordinary skill in the art to which the invention pertains. The terms used herein shall be interpreted not only based on the definition of any dictionary but also the meaning that is used in the field to which the disclosure pertains. In addition, unless clearly defined, the terms used herein shall not be interpreted too ideally or formally.

Hereinafter, exemplary embodiments of the present disclosure will be described in detail with reference to the accompanying drawings, and the same or similar elements are designated by the same reference numerals regardless of the numerals in the drawings and redundant description thereof will be omitted.

For reference, a sensing unit 210, a calculation unit 220, a controller 230, a charged amount measurement unit 310, etc. according to an exemplary embodiment of the present disclosure may be embodied through a non-volatile memory (not shown) configured to store data as to an algorithm configured to control operation of various constituent elements of a vehicle or software commands to reproduce the algorithm, and a processor (not shown) configured to execute operations to be described hereinafter, using the data stored in the memory. The memory and the processor may be embodied as individual chips, respectively. Alternatively, the memory and the processor may be embodied as a single integrated chip. The processor may have a structure including one or more processors. Additionally, the controller may be configured to operate the other units of the system.

Referring to FIGS. 1 to 4, an operation control system of a fuel cell vehicle according to an exemplary embodiment of the present disclosure may include a fuel cell 100, an air supply device 200 operated by a motor, to supply air to the fuel cell 100, a sensing unit 210 configured to sense abnormal operation of the air supply device 200, a calculation unit 220 configured to calculate a lower-limit voltage of the air supply device 200 required for normal operation of the air supply device 200 when the sensing unit 210 senses abnormal operation of the air supply device 200, and a controller 230 configured to adjust a voltage supplied to the air supply device 200 based on the lower-limit voltage calculated in the calculation unit 220.

The fuel cell 100, the air supply device 200, the sensing unit 210, the calculation unit 220, and the controller 230 may be connected via a control line. The fuel cell 100 may include a cathode 110 connected to the air supply unit 200, an anode 120 connected to a hydrogen tank, a coolant 130, which is a cooling device, and a humidifier 10 configured to outwardly discharge air emerging from the anode 120 after being supplied from the air supply device 200 to the anode 120.

The sensing unit 210 may include a plurality of sensors and may be configured to sense operation of the air supply device 100 as abnormal operation when demagnetization occurs in a motor of the air supply device 200. When irreversible demagnetization of permanent magnets, which are main constituent elements of the motor in the air supply device 100, occurs, a maximum driving speed of the motor may be reduced. When high power of the fuel cell vehicle is required in a state in which performance of the air supply device 200 is degraded, supply of air to the fuel cell 100 may be insufficient and, as such, a cell voltage may be momentarily dropped or decreased. In this state, the vehicle may jerk and, as such, acceleration of the vehicle may be limited.

A counter electromotive force constant may be calculated based on a 3-phase output voltage and a measured 3-phase current value, using a 3-phase voltage equation. For convenience of calculation, the 3-phase voltage equation may be converted into a d-q transformation voltage equation.

$$v_{dsyn} = R_s \times I_{dsyn} + L_d \times \frac{dI_{dsyn}}{dt} - L_q \times \omega_e \times I_{qsyn}$$

$$v_{qsyn} = R_s \times I_{qsyn} + L_q \times \frac{dI_{qsyn}}{dt} + L_q \times \omega_e \times I_{qsyn} + V_{emf}$$

$$V_{emf} = \lambda \times \omega_e$$

Expression 1 where,
$V_{dsyn}$: d-axis output voltage
$V_{qsyn}$: q-axis output voltage
$R_s$: phase resistance
$I_{dsyn}$: measured d-axis current value
$I_{qsyn}$: measured q-axis current value
$L_d$: d-axis inductance value
$L_q$: q-axis inductance value
$\omega_e$: electrical angular velocity
$V_{emf}$: counter electromotive force voltage
$\lambda$: counter electromotive force constant In particular, to more accurately calculate variation of the counter electromotive constant through a voltage equation expressed by Expression 1, a motor speed, a 3-phase output voltage and 3-phase current in a duration, in which the motor speed of the air supply device 200 is stable, are measured, and a counter electromotive force constant may then be calculated based on the measured values, a phase resistance, and a designed inductance value. The calculated counter electromotive force constant may be compared with a predetermined counter electromotive force constant value and, as such, whether motor demagnetization of the air supply device 200 has occurred may be sensed.

It may be possible to sense abnormal operation of the air supply device 200 by predetermining a counter electromotive force constant in a normal state, in which no demagnetization occurs, and calculating a counter electromotive force constant based on a currently measured value through the above-described voltage equation. An air supply device position sensor configured to sense a position of the air supply device 200 may be further provided. In particular, incorrect determination may occur when an offset angle of the air supply device position sensor is varied. Accordingly, an operation state may be sensed by the sensing unit 210 after identification as to whether correction of the offset angle is necessary.

When the offset angle of the air supply device position sensor is varied due to impact applied to the fuel cell vehicle or other factors, correct sensing may be impossible. Therefore, it is necessary to identify whether correction of the offset angle is necessary. The calculation unit 220 may be configured to calculate a lower supply voltage limit capable of maintaining a maximum speed of the motor of the air supply device 200 when demagnetization of the motor has occurred, based on a counter electromotive force constant calculated based on sensed results of the sensing unit 210.

Figure 3:
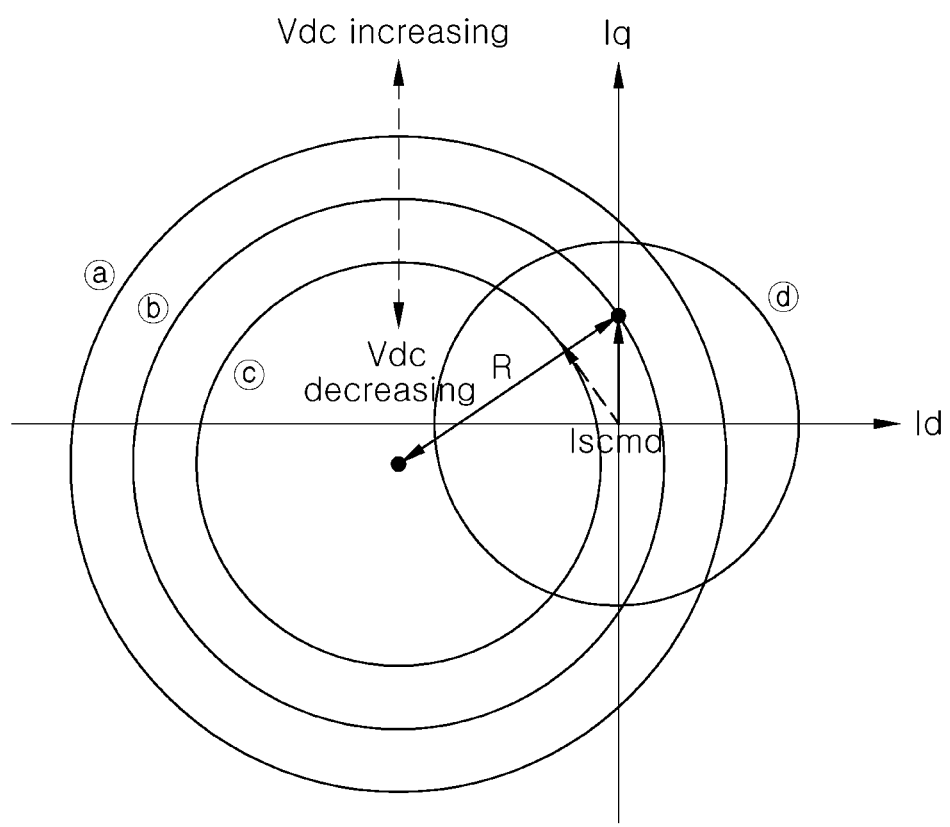
FIG. 3 is a graph of correlation between a current command and a voltage limit represented through a d-q coordinate system for determination of a motor current control command according to an exemplary embodiment of the present disclosure.
Figure 4:
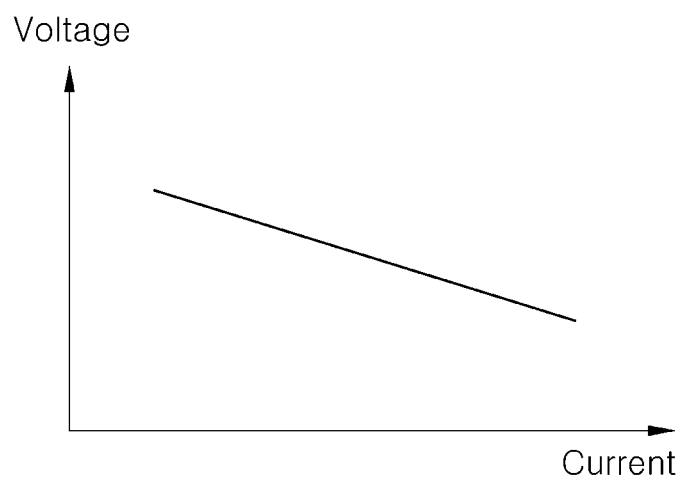
FIG. 4 is a graph of voltage-current correlation in a fuel cell according to an exemplary embodiment of the present disclosure.

Again referring to FIG. 3, the following expression represents correlation between a current command and a voltage limit expressed through a d-q coordinate system, for determination of a motor current control command. In FIG. 3, a circle is a current limitation circle, and is expressed by the following expression.

$$I_{d\_syn}{}^2 + I_{q\_syn}{}^2 \leq I_{smax}{}^2 \qquad \text{Expression 2}$$

Circles ⓐ to ⓒ are voltage limitation circles, and are expressed by the following expression:

$$\left[I_{d\_syn} + \frac{\omega_r^2 L_s \lambda_f}{R_s^2 + \omega_r^2 L_s^2}\right]^2 + \left[I_{q\_syn} + \frac{\omega_r^2 R_s \lambda_f}{R_s^2 + \omega_r^2 L_s^2}\right]^2 \leq \frac{V_{smax}^2}{R_s^2 + \omega_r^2 L_s^2} \qquad \text{Expression 3}$$

where, "$I_{scmd}$" represents a current control command.

The current control command should be disposed inside the current limitation circle and the voltage limitation circles. "$L_s$" is a sum of a d-axis inductance value and a q-axis inductance value, and "$\omega_r$" is an angular speed of the motor.

The following expression expresses relation between a supply voltage $V_{dc}$ and a maximum value $V_{smax}$ of the phase voltage of the motor. In the following expression, "η" is an inverter efficiency, and has a value not less than 0.9, but less than 1.

$$V_{smax} = \frac{V_{dc}}{\sqrt{3}} \eta \qquad \text{Expression 4}$$

The size of each voltage limitation circle determines the magnitude of the supply voltage $V_{dc}$. Accordingly, expressions of the voltage limitation circles obtained through calculation of radii of the voltage limitation circles and an expression of relation between the supply voltage $V_{dc}$ and the maximum value $V_{smax}$ of the phase voltage of the motor may be arranged as follows:

$$R = \sqrt{\left[I_{d\_syn\_cmd} - \frac{\omega_{max}^2 L_s \lambda_{fcal}}{R_s^2 + \omega_{max}^2 L_s^2}\right]^2 + \left[I_{q\_syn\_cmd} - \frac{\omega_{max} R_s \lambda_{fcal}}{R_s^2 + \omega_{max}^2 L_s^2}\right]^2} \qquad \text{Expression 5}$$

$$\frac{V_{dc\_cmd} \eta}{\sqrt{3}(R_s^2 + \omega_{max}^2 L_s^2)} =$$

$$\sqrt{\left[I_{d\_syn\_cmd} - \frac{\omega_{max}^2 L_s \lambda_{fcal}}{R_s^2 + \omega_{max}^2 L_s^2}\right]^2 + \left[I_{q\_syn\_cmd} - \frac{\omega_{max} R_s \lambda_{fcal}}{R_s^2 + \omega_{max}^2 L_s^2}\right]^2}$$

$$V_{dc\_cmd} = \frac{\sqrt{3}(R_s^2 + \omega_{max}^2 L_s^2)}{\eta}$$

$$\sqrt{\left[I_{d\_syn\_cmd} - \frac{\omega_{max}^2 L_s \lambda_{fcal}}{R_s^2 + \omega_{max}^2 L_s^2}\right]^2 + \left[I_{q\_syn\_cmd} - \frac{\omega_{max} R_s \lambda_{fcal}}{R_s^2 + \omega_{max}^2 L_s^2}\right]^2}$$

A minimum required supply voltage value $V_{dc\_cmd}$ for a demagnetized counter electromotive force constant $\lambda_{fcal}$ and a maximum speed $\omega_{max}$ may be derived through Expression 5. It may be seen through Expression 5 that the minimum required supply voltage value $V_{dc\_cmd}$ is increased when the counter electromotive force constant is reduced due to demagnetization of the motor.

In accordance with an exemplary embodiment of the present invention, the operation control system may further include an auxiliary power supply device 300 for auxiliary supply of electric power in addition to the fuel cell 100, a charged amount measurement unit 310 connected to the controller 230 and configured to measure a charged amount of the auxiliary power supply device 300, and a converter 320 connected to the auxiliary power supply device 300, to adjust a voltage of the auxiliary power supply device 300. Particularly, the controller 230 may be configured to adjust a voltage supplied to the air supply device 200 to be a lower-limit voltage by operating the converter 320 connected to the auxiliary power supply device 300 when the charged amount of the auxiliary power supply device 300 measured in the charged amount measurement unit 310 is equal to or greater than a predetermined value. The predetermined value means a reference value for determining whether or not a state of charge (SOC) of the auxiliary power supply device is sufficient.

The converter may be a direct current (DC) power conversion device, and may be connected to the controller 230 to be operated by the controller 230. The converter 300 may be configured to adjust current of the auxiliary power supply device 300 and, as such, may adjust a voltage supplied to the air supply device 200 to be a lower-limit voltage. In addition, the controller 230 may be configured to limit a lower-limit voltage range.

As the voltage value of the converter 320 may be varied in accordance with a lower-limit voltage calculated by the calculation unit 220, there may be influence on an upper limit of recharging or discharging current of the auxiliary power supply device 300. When a counter electromotive force constant calculated upon sensing of motor demagnetization of the air supply device 200 is reduced to be less than a predetermined value, the voltage range of the converter 320 may be substantially reduced. Therefore, the reduction of the counter electromotive force constant may be limited to prevent the above-described phenomenon.

In accordance with another exemplary embodiment of the present invention, the operation control system may further include an auxiliary power supply device 300 for auxiliary supply of electric power in addition to the fuel cell 100, and a charged amount measurement unit 310 configured to measure a charged amount of the auxiliary power supply device 300, which is connected to the air supply device 200. In particular, the controller 230 may be configured to set a lower voltage limit of the fuel cell 100, which supplies a lower-limit voltage to the air supply device 200, when the charged amount of the auxiliary power supply device 300 measured in the charged amount measurement unit 310 is equal to or less than a predetermined value.

Referring again to FIG. 4, when the charged amount of the auxiliary power supply device 300 is insufficient, it is necessary to supply current according to required output power through the fuel cell 100 alone. When generated current increases, the voltage of the fuel cell 100 may be decreased in accordance with an I-V curve representing characteristics of the fuel cell 100. In particular, the voltage of the fuel cell 100 is a supply voltage of the air supply device 200. Accordingly, when the charged amount of the auxiliary power supply device 300 is insufficient, the controller 230 should limit the current of the fuel cell 100 to maintain the voltage of the fuel cell 100 to be equal to or greater than a lower supply voltage limit of the air supply device 200. Thus, the current of the fuel cell 100 may be adjusted based on the set lower voltage limit of the fuel cell 100

In accordance with an exemplary embodiment of the present invention, the operation control system may further include a vehicle motor driven by the fuel cell 100, and a vehicle motor inverter 410 for adjusting rotation of the vehicle motor. In particular, the output current of the vehicle motor inverter 410 may be limited through control of the current of the fuel cell 100.

Referring again to FIG. 2, the operation control method of the fuel cell vehicle according to the illustrated exemplary embodiment of the present invention to accomplish the above-described object may include sensing (S10) abnormal operation of the air supply device 200, calculating (S11) a lower-limit voltage of the air supply device 200 required for normal operation when abnormal operation of the air supply device 200 is sensed, and adjusting (S21-S31) a voltage supplied to the air supply device 200 based on the calculated lower-limit voltage. Notably, the control method described herein may be executed by the controller 230.

In the sensing process S10, abnormal operation of the air supply device 100 may be sensed when demagnetization occurs in the motor of the air supply device 200. In particular, a motor speed, a 3-phase output voltage and 3-phase current in a duration, in which the motor speed of the air supply device 200 is stable (e.g., constant), may be measured, and a counter electromotive force constant may then be calculated based on the measured values, a phase resistance, and a designed inductance value. The calculated counter electromotive force constant may be compared with a predetermined counter electromotive force constant value and, as such, whether motor demagnetization of the air supply device 200 has occurred may be sensed.

The operation control method of the fuel cell vehicle may further include measuring (S20) a charged amount of the auxiliary power supply device 300, before adjusting (S21) of the voltage. In particular, the a voltage supplied to the air supply device 200 may be adjusted to be a lower-limit voltage by operating the converter 320 connected to the auxiliary power supply device 300 when the measured charged amount of the auxiliary power supply device 300 is equal to or greater than a predetermined value.

The operation control method of the fuel cell vehicle may further include measuring (S20) a charged amount of the auxiliary power supply device 300 prior to adjusting the voltage. In particular, the adjusting of the voltage (S31) may include setting (S30) a lower voltage limit of the fuel cell 100, which supplies a lower-limit voltage to the air supply device 200, when the measured charged amount of the auxiliary power supply device 300 is equal to or less than a predetermined value. Thus, the adjusting of the voltage (S31) may include adjusting the current of the fuel cell 100 based on a predetermined lower voltage limit of the fuel cell 100.

As apparent from the above description, the present disclosure has an effect of preventing an insufficient air supply state of the fuel cell by calculating a lower limit of a supply voltage of the air supply device for normal operation when motor demagnetization of the air supply device occurs, and adjusting the supply voltage through voltage control for the auxiliary power supply device or current control for the fuel cell in accordance with a vehicle state based on the calculated lower supply voltage limit.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. An operation control system of a fuel cell vehicle, comprising:
   a fuel cell;
   an air supply device operated, by a motor, to supply air to the fuel cell;
   a sensing unit configured to sense operation of the air supply device as abnormal operation when demagnetization occurs in a motor of the air supply device;
   a calculation unit configured to calculate a lower-limit voltage of the air supply device required for normal operation of the air supply device when the sensing unit senses abnormal operation of the air supply device; and
   a controller configured to adjust a voltage supplied to the air supply device to maintain a voltage of the fuel cell to be equal to or greater than the lower-limit voltage based on the calculated lower-limit voltage.

2. The operation control system according to claim 1, wherein the sensing unit is configured to sense occurrence of demagnetization in the motor of the air supply device in a duration in which a speed of the motor of the air supply device is stable.

3. The operation control system according to claim 1, wherein the sensing unit is configured to:
   measure a motor speed, a 3-phase output voltage and 3-phase current in a duration,
   calculate a counter electromotive force constant based on the measured values, a phase resistance, and a designed inductance value; and
   compare the calculated counter electromotive force constant with a predetermined counter electromotive force constant value to sense whether demagnetization of the motor of the air supply device has occurred.

4. The operation control system according to claim 1, wherein the calculation unit is configured to calculate a lower limit of a supply voltage for maintaining a maximum speed of the motor of the air supply device when demagnetization of the motor of the air supply device has occurred, based on a counter electromotive force constant calculated from sensed results of the sensing unit.

5. The operation control system according to claim 1, further comprising:
- an auxiliary power supply device for auxiliary supply of electric power in addition to the fuel cell;
- a charged amount measurement unit connected to the controller and configured to measure a charged amount of the auxiliary power supply device; and
- a converter connected to the auxiliary power supply device and configured to adjust a voltage of the auxiliary power supply device,
- wherein the controller is configured to adjust the voltage supplied to the air supply device to be a lower-limit voltage by operating the converter connected to the auxiliary power supply device when the measured charged amount of the auxiliary power supply device is equal to or greater than a predetermined value.

6. The operation control system according to claim 1, wherein the controller is configured to limit a lower-limit voltage range.

7. The operation control system according to claim 1, further comprising:
- an auxiliary power supply device for auxiliary supply of electric power in addition to the fuel cell; and
- a charged amount measurement unit connected to the controller and configured to measure a charged amount of the auxiliary power supply device,
- wherein the controller is configured to set a lower voltage limit of the fuel cell, which supplies a lower-limit voltage to the air supply device, when the measured charged amount of the auxiliary power supply device is equal to or less than a predetermined value.

8. The operation control system according to claim 7, wherein the controller is configured to adjust current of the fuel cell based on the set lower voltage limit of the fuel cell.

9. The operation control system according to claim 8, further comprising:
- a vehicle motor driven by the fuel cell; and
- a vehicle motor inverter configured to adjust rotation of the vehicle motor,
- wherein output current of the vehicle motor inverter is limited through adjustment of the current of the fuel cell.

10. An operation control method of a fuel cell vehicle, comprising:
- sensing, by a controller, operation of an air supply device as abnormal operation when demagnetization occurs in a motor of the air supply device to supply air to a fuel cell;
- calculating, by the controller, a lower-limit voltage of the air supply device required for normal operation when abnormal operation of the air supply device is sensed; and
- adjusting, by the controller, a voltage supplied to the air supply device to maintain a voltage of the fuel cell to be equal to or greater than the lower-limit voltage based on the calculated lower-limit voltage.

11. The operation control method according to claim 10, wherein the sensing of the abnormal operation includes:
- measuring, by the controller, a motor speed, a 3-phase output voltage and 3-phase current in a duration, in which a speed of the motor of the air supply device is stable;
- calculating, by the controller, a counter electromotive force constant based on the measured values, a phase resistance, and a designed inductance value; and
- comparing, by the controller, the calculated counter electromotive force constant with a predetermined counter electromotive force constant value to sense whether demagnetization of the motor of the air supply device has occurred.

12. The operation control method according to claim 10, further comprising:
- measuring, by the controller, a charged amount of an auxiliary power supply device prior to adjusting the voltage; and
- adjusting, by the controller, the voltage supplied to the air supply device to be a lower-limit voltage by operating a converter connected to the auxiliary power supply device when the measured charged amount of the auxiliary power supply device is greater than a predetermined value.

13. The operation control method according to claim 10, further comprising:
- measuring, by the controller, a charged amount of an auxiliary power supply device prior to adjusting the voltage; and
- setting, by the controller, a lower voltage limit of a fuel cell, which supplies a lower-limit voltage to the air supply device, when the measured charged amount of the auxiliary power supply device is equal to or less than a predetermined value.

14. The operation control method according to claim 13, further comprising adjusting, by the controller, current of the fuel cell based on the set lower voltage limit of the fuel cell.

* * * * *